Figure 1:
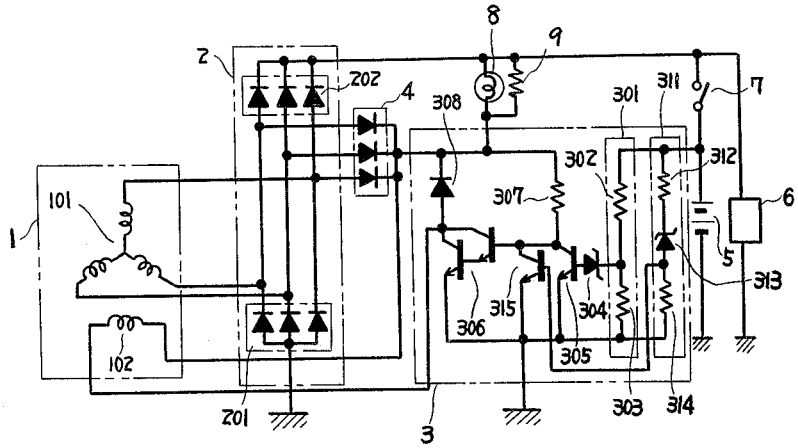
Figure 2:
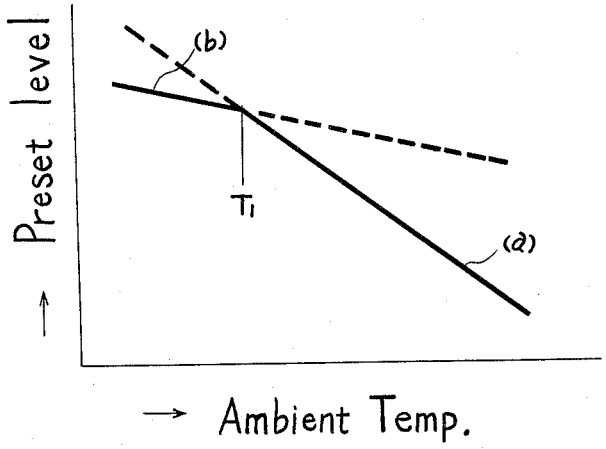

DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED SEPTEMBER 2, 1975

938 O.G. 9

T938,011

VOLTAGE REGULATING SYSTEM FOR AN AUTOMOTIVE VEHICLE

Katsumi Itoh, Ohbu, and Kazumasa Mori, Aichi-ken, Japan, assignors to Nippondenso Co., Ltd., Kariya-chi, Aichi-ken, Japan

Filed Sept. 17, 1974, Ser. No. 506,852
Claims priority, application Japan, Sept. 29, 1973, 48/109,572
Int. Cl. H02p *9/30*
U.S. Cl. 322—28
1 Sheet Drawing. 9 Pages Specification

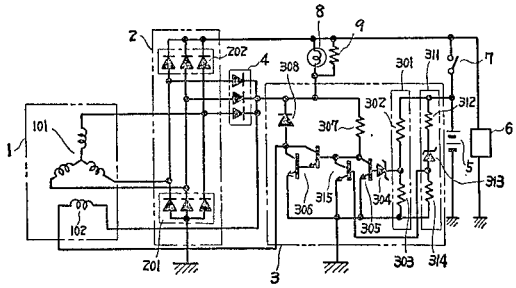

In a voltage regulating system, a first and second voltage sensing circuit are parallely connected to a battery for providing respectively a first and second preset level at which the battery voltage is regulated. Since a voltage gradient of one of the voltage sensing circuits is higher than that of the other, the battery voltage is regulated at a level which is the lower one among the first and second preset levels, whereby the battery charging voltage is prevented from rising excessively at lower temperatures.

VOLTAGE REGULATING SYSTEM FOR AN AUTOMOTIVE VEHICLE

Filed Sept. 17, 1974